United States Patent

Stefanowitz et al.

[15] 3,659,815
[45] May 2, 1972

[54] FISHING ROD HOLDER

[72] Inventors: Albert J. Stefanowitz; Kathleen E. Stefanowitz, both of 15656 S. E. Division, Space 11, Portland, Oreg. 97236

[22] Filed: Oct. 9, 1970

[21] Appl. No.: 79,537

[52] U.S. Cl. ...................................................248/42
[51] Int. Cl. ...........................................A01k 97/10
[58] Field of Search ........................248/38–40, 42, 248/43; 43/21.2

[56] References Cited

UNITED STATES PATENTS

| 2,724,569 | 11/1955 | Licata | 248/42 |
| 3,089,674 | 5/1963 | Bastie | 248/40 |
| 3,564,753 | 2/1971 | Fravel | 248/42 |

*Primary Examiner*—William H. Schultz
*Attorney*—Buckhorn, Blore, Klarquist & Sparkman

[57] ABSTRACT

A fishing rod holder has an upwardly opening, U-shaped trough holder member for supporting a fishing rod and a ring member pivotally mounted rearwardly of the holder member and having an internal diameter sufficient to permit the end of the fishing rod to pass therethrough. The ring member is pivotal between a first position in which its longitudinal axis is colinear with the longitudinal axis of the holder member when the fishing rod is supported thereby, and a second position in which the longitudinal axis of the ring member is generally vertical. In this latter position, the ring member permits the end of the fishing rod to pass further through it and contact the gunwale, the reel on the fishing rod being retained by the ring member when in this second position.

4 Claims, 4 Drawing Figures

Patented May 2, 1972

3,659,815

ALBERT J. STEFANOWITZ
KATHLEEN E. STEFANOWITZ
INVENTORS.

BY

BUCKHORN, BLORE, KLARQUIST & SPARKMAN
ATTORNEYS

FISHING ROD HOLDER

BACKGROUND OF THE INVENTION

This invention relates to an improved support and holder for a fishing rod, and more particularly, to a holder adapted to support a reel-equipped fishing rod atop the gunwale of a fishing boat.

There are fishing rod holders presently available suitable for retaining an unattended fishing rod in position to wait for a strike. Such holders, however, do not provide support for the rod when it is desired to tilt the rod to a generally vertical position, as for example, when baiting the hook.

Accordingly, it is the primary object of the present invention to provide a fishing rod holder that will be able to hold the rod securely when waiting for a strike and will still provide support for the rod when the user desires to pivot the same to a generally vertical position.

It is a further object of the present invention to provide such a rod holder that will permit quick insertion or withdrawal of the rod from the holder when the rod is in such vertical position.

SUMMARY OF THE INVENTION

My fishing rod holder comprises an upwardly-opening U-shaped trough holder member adapted to support a fishing rod when the same is left unattended. The holder member retains the rod by furnishing support for the reel adjacent the forward end of the holder member.

Support means are provided rigidly to mount the holder member with its longitudinal axis in a generally inclined position atop the gunwale of a fishing boat or the like. A bracing member is disposed between and rigidly attached to the support means and the aft end of the holder member. A ring member is hingedly connected to the bracing member and is disposed aft of the holder member. The ring member has an internal diameter sufficient to permit the end of the fishing rod to pass therethrough.

The ring member is pivotal between a first position in which its longitudinal axis is colinear with the longitudinal axis of the holder member when the fishing rod is being supported by the latter, and a second position in which the longitudinal axis of the ring member is generally vertical. The ring member permits the end of the fishing rod further to pass through it and contact the gunwale of the boat when in this second or vertical position, the reel being retained by the ring member.

DESCRIPTION OF THE PREFERRED EMBODIMENT

Figure 1:
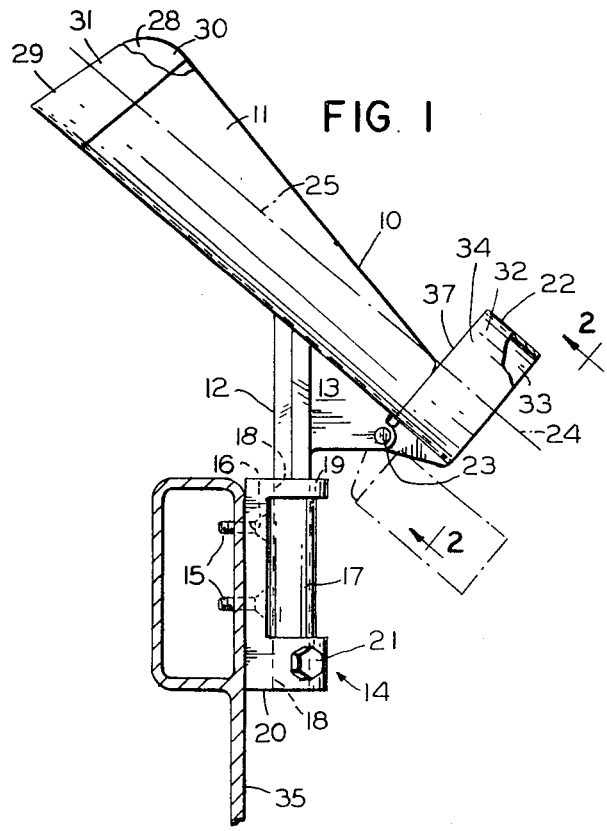
FIG. 1 is a side elevational view, with parts broken away, of a fishing rod holder in accordance with the present invention, the second or generally vertical position of the ring member being shown in phantom.
Figure 2:
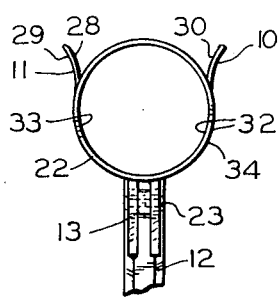
FIG. 2 shows a portion of the device of FIG. 1 viewed along the line 2—2 of FIG. 1.

Referring to the drawings, my fishing rod holder includes a holder member 10 in the form of an upwardly opening, U-shaped trough 11 rigidly mounted on a hexagonal standard 12 and braced in position by a triangular bracing member 13. The standard 12 is releasably secured in a bracket 14 which may be mounted on the gunwale or sidewall 35 of a boat by screws 15 extending through holes 16.

The bracket 14 is provided with a tube 17 for receiving the standard 12. The tube 17 is positioned in aligned bores 18 in the upper and lower portions 19 and 20 of the bracket 14. The standard 12 is held in adjusted position by a set screw 21.

A ring 22 is hinged to the bracing member 13 at 23 and pivots between a first position in which its longitudinal axis 24 is colinear with the longitudinal axis 25 of the holder member 10 and a second position in which axis 24 is generally vertical.

Ring 22 has an internal diameter sufficient to permit the end of a fishing rod 26 to pass therethrough, the ring however being adapted to retain the rod in the generally vertical position by furnishing support to its reel 27. See FIG. 4.

Holder member 10 is preferably formed in the shape of a generally truncated cone, the minor diameter of which is disposed adjacent ring 22. A coating of plastic material 28 is disposed on the inner and outer surfaces 29 and 30 of the forward end 31 of holder member 10. A similar coating 32 is provided on the inner and outer surfaces 33 and 34 of the ring 22. Plastic coatings 28 and 32 serve to prevent any damage to the fishing pole.

Figure 3:
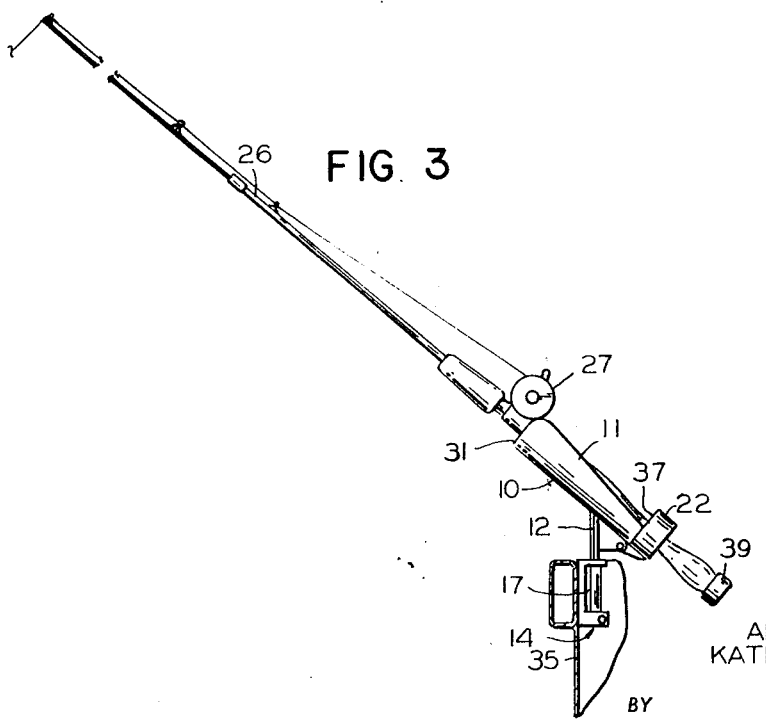
FIG. 3 is a view of a fishing rod being supported by the holder of the present invention when the rod is in the generally inclined position while waiting for a strike.

When the fisherman is waiting for a strike, the rod 26 occupies the position shown in FIG. 3. The rod 26 is cradled in trough 11 with the reel 27 being retained forward of but adjacent the forward end 31 of holder 10, the end 39 of the rod passing through ring 22. When there is a strike or when it is desired to bait the hook, the rod 26 can be quickly raised to the position shown in FIG. 4, the end of the rod passing further through ring 22 to contact the gunwale 35 at 36. In this position, reel 27 is retained by the upper surface 37 of ring 22. When in this position the handle of the rod can be easily inserted or withdrawn from the ring by movement in the vertical direction.

Figure 4:
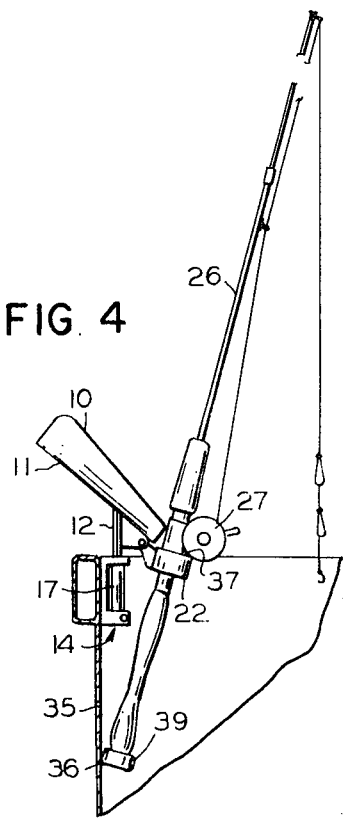
FIG. 4 is a view of the rod in the holder when the ring member is pivoted to its second position, the rod being in a generally vertical position with its end in contact with the gunwale.

As can be seen from the drawings, the rod 26 is securely retained by the combination of trough 11 and ring 22 when in the trolling position. When the rod is tipped upwardly, as shown in FIG. 4, the end is permitted to slide down further through ring 22 to contact gunwale 35 and find support in this position.

When the rod 26 is again returned to the position shown in FIG. 3, by pulling the rod upwardly through the ring 22 until the reel 27 will clear the upper end of the trough member 11 and angularly lowering the rod, the sides of the trough member in conjunction with the holding action of the ring cause the rod to be guided into the trough member. This also occurs any time the rod is partially raised, for example, to set the hook. The provision of the plastic coatings 28 and 32 prevents damage to the rod when in either position.

Having described a preferred embodiment of our invention, it should be apparent to those having skill in the art that the same permits various modifications in arrangement and detail. We claim as our invention all such modifications as come within the true spirit and scope of the following claims.

We claim:

1. A fishing rod holder comprising
   an upwardly opening, U-shaped trough holder member adapted to support a fishing rod when the same is left unattended, the reel on said fishing rod being retainable forward of and adjacent the forward end of said holder member;
   support means adapted rigidly to mount said holder member with its longitudinal axis in a generally inclined position atop the gunwale of a fishing boat or the like;
   a bracing member disposed between and rigidly attached to said support means and the aft end of said holder member; and
   a ring member hingedly connected to said bracing members and disposed aft of said holder member, said ring member having an internal diameter sufficient to permit the end of said fishing rod to pass therethrough, said ring member being pivotal between a first position in which its longitudinal axis is colinear with said longitudinal axis of said holder member when said fishing rod is being supported by the latter, and a second position in which its longitudinal axis is generally vertical, said ring member being adapted to permit said end of said fishing rod further to pass through said ring member and contact said gunwale with said reel on said fishing rod being retained by said ring member when the same is in said second position.

2. A fishing rod holder as in claim 1 in which said holder member is generally in the shape of a truncated cone, the minor diameter of said cone being disposed adjacent said ring member.

3. A fishing rod holder as in claim 1 further comprising a coating of plastic material on the inner and outer surfaces of said ring member.

4. A fishing rod holder as in claim 1 further comprising a coating of plastic material on the inner and outer surfaces of said forward end of said holder member.

* * * * *